United States Patent
Kim

(10) Patent No.: US 11,801,889 B2
(45) Date of Patent: Oct. 31, 2023

(54) APPARATUS AND METHOD FOR CONTROLLING MOTOR DRIVEN POWER STEERING

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 183 days.

(21) Appl. No.: 17/369,928

(22) Filed: Jul. 7, 2021

(65) Prior Publication Data

US 2022/0009549 A1    Jan. 13, 2022

(30) Foreign Application Priority Data

Jul. 13, 2020    (KR) .................. 10-2020-0086019

(51) Int. Cl.
*B62D 5/04*    (2006.01)
*B62D 6/00*    (2006.01)
(Continued)

(52) U.S. Cl.
CPC .......... *B62D 5/0463* (2013.01); *B62D 5/049* (2013.01); *B62D 6/002* (2013.01); *G01B 21/22* (2013.01); *G01P 3/481* (2013.01)

(58) Field of Classification Search
CPC ...... B60W 2510/20; B60W 2050/0215; G01B 21/22; G01P 3/481
See application file for complete search history.

(56) References Cited

U.S. PATENT DOCUMENTS

2018/0170422 A1*  6/2018  Yoshida ............... B62D 5/0472
2019/0002022 A1    1/2019  Kim
(Continued)

FOREIGN PATENT DOCUMENTS

| JP | 2018-065490 | 4/2018 |
|---|---|---|
| KR | 10-2019-0098783 | 8/2019 |

OTHER PUBLICATIONS

English Language Abstract of KR 10-2019-0098783 published Aug. 23, 2019.
(Continued)

*Primary Examiner* — Jeff A Burke
*Assistant Examiner* — Jerrod Irvin Davis
(74) *Attorney, Agent, or Firm* — DLA PIPER LLP (US)

(57) ABSTRACT

An apparatus for controlling an MDPS may include: a filtering unit configured to filter a specific frequency from a first current steering angle provided from a steering angle sensor; a command steering angle control unit configured to remove noise of a first command steering angle inputted from an autonomous driving system, and output a second command steering angle; a steering angle position control unit configured to compensate for a first steering angle error corresponding to the difference between the second command steering angle and the first current steering angle filtered by the filtering unit, and output a first command current; and a responsiveness improvement unit configured to compensate for a second steering angle error corresponding to the difference between the second command steering angle and a second current steering angle provided from a motor, and apply the compensation result value to the steering angle position control unit.

17 Claims, 2 Drawing Sheets

(51) Int. Cl.
  *G01B 21/22* (2006.01)
  *G01P 3/481* (2006.01)

(56) References Cited

U.S. PATENT DOCUMENTS

2020/0010111 A1   1/2020  Tsubaki
2021/0206424 A1*  7/2021  Nakakuki ............ B62D 5/0463
2021/0362775 A1* 11/2021  Nagano ................ B62D 5/0463

OTHER PUBLICATIONS

Extended European Search Report dated Dec. 6, 2021 issued in EP 21184541.7.

* cited by examiner

APPARATUS AND METHOD FOR CONTROLLING MOTOR DRIVEN POWER STEERING

CROSS-REFERENCE TO RELATED APPLICATION

This application claims priority from and the benefit of Korean Patent Application No. 10-2020-0086019, filed on Jul. 13, 2020, which is hereby incorporated by reference for all purposes as if set forth herein.

BACKGROUND

Field

Exemplary embodiments of the present disclosure relate to an apparatus and method for controlling an MDPS (Motor Driven Power Steering), and more particularly, to an apparatus and method for controlling an MDPS, which can raise responsiveness in an R-MDPS during autonomous driving, is robust to noise of a command steering angle, and can maximize stability.

Discussion of the Background

In general, a hydraulic power steering apparatus using hydraulic pressure of a hydraulic pump had been used as a power assisted steering apparatus of a vehicle. After the 1990s, however, an MDPS using an electric motor has been universally used.

In the existing hydraulic power steering apparatus, the hydraulic pump serving as a power source to provide power is driven by an engine, and always consumes energy regardless of whether a steering wheel is turned. In the MDPS, however, a motor driven by electric energy provides steering assist power when a steering wheel is turned to generate torque.

Therefore, when the MDPS (or motor driven steering apparatus) is used, the energy efficiency of the vehicle can be improved further than when the hydraulic power steering apparatus is used.

When a risk of collision or another accident suddenly occurs during autonomous driving, a vehicle to which an autonomous driving mode is applied needs to avoid an obstacle or the like by reducing vehicle speed or performing steering control. However, the vehicle to which the existing autonomous driving mode is applied is only designed to cope with a typical situation in which an obstacle is detected at a designated distance in advance, but not designed to cope with an emergency situation (e.g. a situation in which a pedestrian or another vehicle suddenly appears ahead of the vehicle).

Therefore, in case of a non-emergency situation, it is typically effective to reduce the vehicle speed in advance. However, in case of an emergency situation (e.g. a situation in which a pedestrian or another vehicle suddenly appears), it may be more effective to perform sudden steering, in order to avoid an accident. However, when the autonomous driving mode is disabled or abnormally performed in such an emergency situation as in the vehicle to which the existing autonomous driving mode is applied, the driver (or user) may be placed in a more dangerous situation. Therefore, there is a need for technology capable of maximizing responsiveness such that steering can be instantaneously and quickly performed in response to an emergency situation, while the autonomous driving mode is continuously retained. At this time, a motor of the MDPS can be controlled, but a steering wheel connected to a column may be vibrated. When the responsiveness becomes extremely high regardless of intention, the control stability may be reduced. In this case, disturbance, mechanism friction or sensor noise may be caused by an external factor, and thus degrade the response performance of a controller or generate unintended vibration.

Therefore, the responsiveness needs to be raised during autonomous driving, and the performance needs to be stably maximized despite noise caused by an external factor. To this end, the performance of a position controller of the MDPS needs to be maximized, and an R-MDPS driven through a belt typically uses a motor angle rather than a steering angle outputted from a steering angle sensor, in order to perform control. However, when a belt slip occurs, the belt slip may pose a greater threat to a driver. Thus, there is a need for a technology that can exhibit position controller performance, which is similar to the position controller performance when the motor angle is used, even while using the steering angle of the steering angle sensor having relatively low performance.

During autonomous driving, a large command steering angle may be applied as the pattern of a command steering angle transmitted by an autonomous driving system (e.g. an impulse pattern), and noise may also be applied to the command steering angle. Thus, an LPF (Low Pass Filter) is applied to the command steering angle. However, when the LPF is applied to the command steering angle, the LPF may act as a factor to degrade the performance of the position controller. Thus, there is a need for a technique which is robust to the noise of the command steering angle and thus can raise the responsiveness and the stability of the controller. The related art of the present disclosure is disclosed in Korean Patent Application Laid-Open No. 10-2019-0098783 published on Aug. 23, 2019 and entitled "Apparatus for Controlling Handle of Vehicles".

SUMMARY

Various embodiments are directed to an apparatus and method for controlling an MDPS (Motor Driven Power Steering), which can raise responsiveness in an R-MDPS during autonomous driving, is robust to noise of a command steering angle, and can maximize stability.

The problems to be solved by the present disclosure are not limited to the above-mentioned problems, and the other unmentioned problems will be clearly understood from the following description by those skilled in the art.

In an embodiment, an apparatus for controlling an MDPS may include: a filtering unit configured to filter a specific frequency from a first current steering angle provided from a steering angle sensor; a command steering angle control unit configured to remove noise of a first command steering angle inputted from an autonomous driving system, and output a second command steering angle; a steering angle position control unit configured to compensate for a first steering angle error corresponding to the difference between the second command steering angle and the first current steering angle filtered by the filtering unit, and output a first command current; and a responsiveness improvement unit configured to compensate for a second steering angle error corresponding to the difference between the second command steering angle and a second current steering angle provided from a motor, and apply the compensation result value to the steering angle position control unit.

The filtering unit may remove column torque of a frequency component which is generated in case of a user's unintended steering intervention, and the frequency component generated in case of the user's unintended steering intervention may be a vibration frequency equal to the resonance point of a torsion bar of the MDPS within an error range.

The filtering unit may include one or more of a band stop filter, a notch filter and a lead-lag filter.

The command steering angle control unit may include a variable LPF (Low Pass Filter) configured to remove noise of the first command steering angle by adjusting a cut-off frequency according to a steering condition.

The command steering angle control unit may further include a differentiator configured to output a current steering angular velocity by differentiating the filtered first current steering angle, and adjust the cut-off frequency of the variable LPF based on the current steering angular velocity.

The steering angle position control unit may output a second command current by applying the compensation result value, received from the responsiveness improvement unit, to the first command current, and include: a position controller configured to compensate for the first steering angle error; a velocity controller configured to output the first command current by compensating for a velocity error corresponding to the difference between a current steering angular velocity and a command speed outputted from the position controller; and a first calculator configured to output the second command current by adding the compensation result value to the first command current.

The responsiveness improvement unit may include: a variable LPF configured to low pass-filter the second steering angle error by adjusting a cut-off frequency; a differentiator configured to differentiate the low pass-filtered value; and a second calculator configured to multiply the differentiated value by a gain, and apply the multiplication result value as the compensation result value to the steering angle position control unit.

The variable LPF may adjust the cut-off frequency based on the angular velocity of the motor or a steering angular velocity.

The second calculator may multiply the differentiated value by a gain based on the angular velocity of the motor or a steering angular velocity.

The apparatus may further include a current controller configured to compensate for a current error corresponding to the difference between a sensor current and a command current outputted from the steering angle position control unit, and output a final command current.

In an embodiment, a method for controlling an MDPS may include: filtering, by a filtering unit, a specific frequency from a first current steering angle provided from a steering angle sensor; removing, by a command steering angle control unit, noise of a first command steering angle inputted from an autonomous driving system, and outputting a second command steering angle; compensating for, by a steering angle position control unit, a first steering angle error corresponding to the difference between the second command steering angle and the first current steering angle filtered by the filtering unit, and outputting a first command current; compensating for, by a responsiveness improvement unit, a second steering angle error corresponding to the difference between the second command steering angle and a second current steering angle provided from a motor, and applying the compensation result value to the steering angle position control unit; and outputting, by the steering angle position control unit, a second command current by applying the compensation result value to the first command current.

In the filtering of the specific frequency, the filtering unit may remove column torque of a frequency component which is generated in case of a user's unintended steering intervention, and the frequency component generated in case of the user's unintended steering intervention may be a vibration frequency which is equal to the resonance point of a torsion bar of the MDPS within an error range.

The outputting of the second command steering angle may include removing, by a variable LPF, noise of the first command steering angle by adjusting a cut-off frequency according to a steering condition, and outputting a second command steering angle from which the noise is removed.

The outputting of the second command steering angle may include: outputting, by a differentiator, a current steering angular velocity by differentiating the filtered first current steering angle; and adjusting, by the variable LPF, the cut-off frequency based on the output current steering angular velocity.

The outputting of the first command current may include: outputting, by a position controller, a command velocity by compensating for the first steering angle error; and outputting, by a velocity controller, the first command current by compensating for a velocity error corresponding to the difference between a current steering angular velocity and the command velocity outputted from the position controller.

The applying of the compensation result value to the steering angle position control unit may include: low pass-filtering, by a variable LPF, the second steering angle error by adjusting a cut-off frequency; differentiating, by a differentiator, the low pass-filtered value; and multiplying, by a second calculator, the differentiated value by a gain, and applying the multiplication result value as the compensation result value to the steering angle position control unit.

In the low pass-filtering of the second steering angle error, the variable LPF may adjust the cut-off frequency based on the angular velocity of the motor or a steering angular velocity.

In the applying of the compensation result value to the steering angle position control unit, the second calculator may multiply the differentiated value by a gain based on the angular velocity of the motor or a steering angular velocity.

The method may further include outputting, by a current controller, a final command current by compensating for a current error corresponding to the difference between the second command current and a sensor current, and applying the final command current to the MDPS, after the outputting of the second command current.

The apparatus and method for controlling an MDPS in accordance with an aspect of the present disclosure may raise the responsiveness of the R-MDPS during autonomous driving, and stably maximize the performance thereof, thereby enabling a vehicle to avoid an accident.

Furthermore, the apparatus and method for controlling an MDPS in accordance with another aspect of the present disclosure can improve the responsiveness even while the steering angle position control unit 200 basically uses the steering angle of the steering angle sensor for a driver's safety. Even when a belt slip occurs, the apparatus and method can maintain autonomous driving without any problems.

Furthermore, the apparatus and method for controlling an MDPS in accordance with still another aspect of the present disclosure may be robust to noise of the command steering angle, and thus raise the stability of the controller and the responsiveness.

DETAILED DESCRIPTION OF THE ILLUSTRATED EMBODIMENTS

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The process may further include a component capable of communicating with another device.

Figure 1:
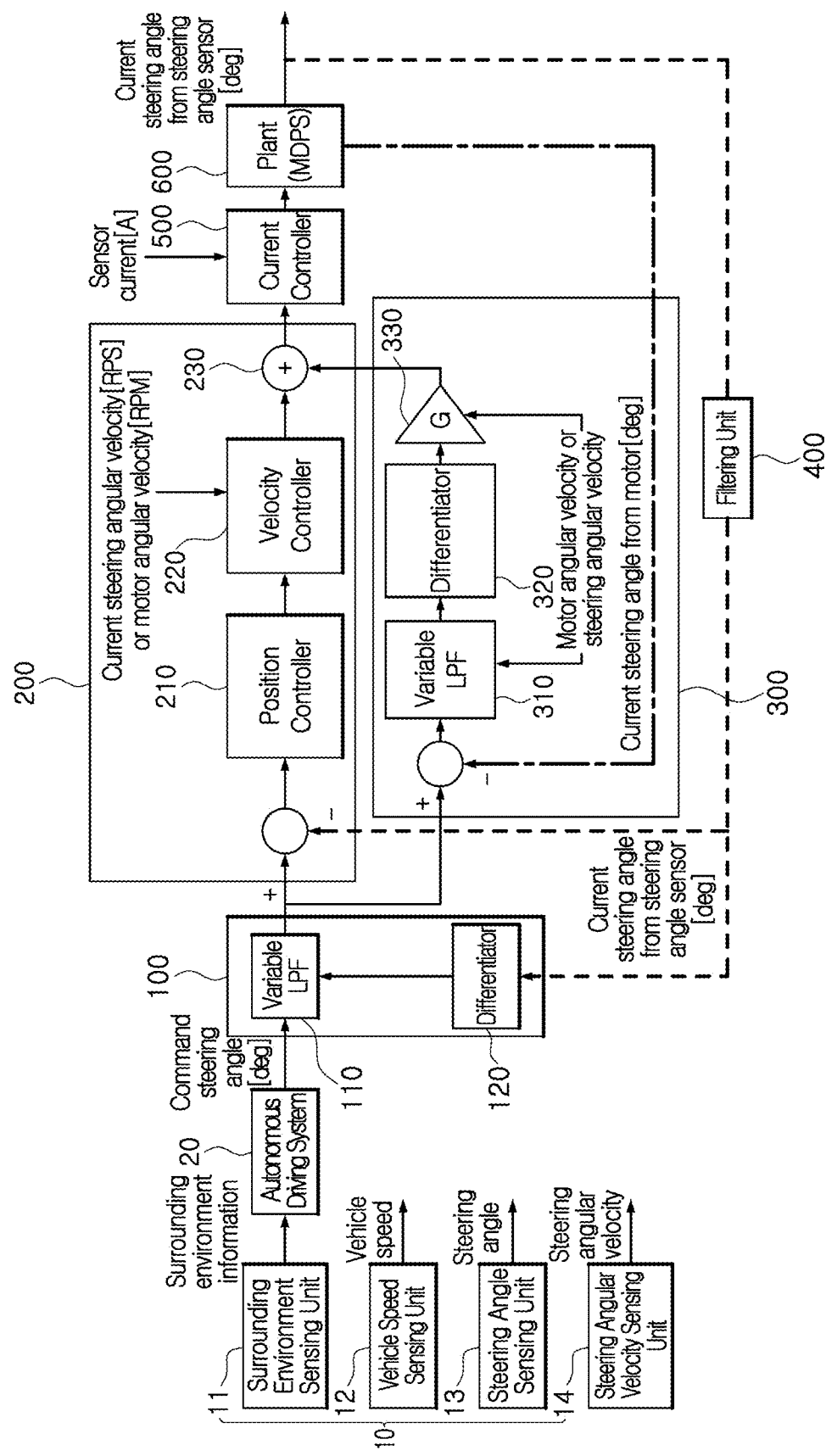
FIG. 1 is a block diagram illustrating a schematic configuration of an apparatus for controlling an MDPS (Motor Driven Power Steering) in accordance with an embodiment of the present disclosure.

FIG. 1 is a block diagram illustrating a schematic configuration of an apparatus for controlling an MDPS (Motor Driven Power Steering) in accordance with an embodiment of the present disclosure.

Referring to FIG. 1, the apparatus for controlling an MDPS in accordance with the embodiment of the present disclosure includes a sensing module 10, an autonomous driving system 20, a command steering angle control unit 100, a steering angle position control unit 200, a responsiveness improvement unit 300, a filtering unit 400 and a current controller 500.

The sensing module 10 senses information required for autonomous driving and steering control. The sensing module 10 may include a surrounding environment sensing unit 11, a vehicle speed sensing unit 12, a steering angle sensing unit 13 and a steering angular velocity sensing unit 14. The surrounding environment sensing unit 11 may sense surrounding environment information required for an operation of the autonomous driving system 20. The vehicle speed sensing unit 12 may sense the vehicle speed of a vehicle. The steering angle sensing unit 13 may sense the steering angle of a steering wheel. The steering angular velocity sensing unit 14 may sense the steering angular velocity of the steering wheel.

Examples of the surrounding environment sensing unit 11 may include a lidar, a radar, an ultrasonic sensor, an image sensor and the like. The surrounding environment information may include road information, obstacle information, weather information and the like. The surrounding environment information is not limited to the above-described embodiment.

As the vehicle speed sensing unit 12, a vehicle speed sensor may be used. For example, a sensor may be utilized, which senses vehicle speed by sensing the angular velocity of a differential gear inside a transmission through a hall sensor-based method. Besides, however, various components capable of sensing the speed of the vehicle may be employed.

As the steering angle sensing unit 13, various types of steering angle sensors may be employed, which can sense the steering angle of the steering wheel. Furthermore, as the steering angular velocity sensing unit 14, various types of sensors may be employed, which can sense the steering angular velocity of the steering wheel.

The steering angular velocity sensing unit 14 may directly sense the steering angular velocity from the steering wheel, but sense the steering angular velocity by differentiating the steering angle sensed by the steering angle sensing unit 13. In this case, the steering angular velocity sensing unit 14 may include an integrated circuit which receives a steering angle and converts the steering angle into a steering angular velocity or a controller which can perform general-purpose functions as well as differentiation.

In the autonomous driving mode, the autonomous driving system 20 outputs a command steering angle for autonomous driving control of the vehicle, based on the surrounding environment information inputted from the surrounding environment sensing unit 11.

When the autonomous driving system 20 mounted in the vehicle performs autonomous driving control based on the surrounding environment information, various systems and methods may be utilized, and various embodiments which are publicly known to this technical field may be employed for use. Thus, the detailed descriptions thereof will be omitted in this specification.

In the R-MDPS driven through a belt, the resolution of an encoder sensor of a motor is much higher than the actual resolution of the steering angle sensor, and the motor itself is directly associated with a motion of the vehicle or connected to a rack bar through the belt. Therefore, a steering angle by the motor is frequently used for position control. However, this system may cause a fatal problem. The fatal problem is a belt slip. When a belt slip occurs during autonomous driving, the position control may not be normally performed, and the belt slip may cause a serious problem in safety. Thus, in a safety aspect, it is necessary to perform position control based on the steering angle sensor which is mechanically connected. However, the steering angle sensor has low resolution, is not mechanically complete, and is mounted on a torsion bar with a spring. Therefore, when position control is performed during autonomous driving, unintended vibration or the like may occur. Typically, the torsion bar is a portion which has the lowest stiffness in the MDPS. Since the steering angle sensor is mounted on the torsion bar, an angle different from an actual behavior of the vehicle may occur. For example, when a driver instantaneously hits the steering wheel by mistake, the autonomous driving system applies a sudden steering command, or vibration is applied to an MDPS 600 according to a road condition, the control performance may be degraded, and vibration may be generated. In order to solve such problems, the position control is basically performed by the steering angle sensor, but a filter for avoiding the resonance point of the torsion bar may be applied.

Thus, the apparatus in accordance with the embodiment of the present disclosure includes the filtering unit 400 to avoid the resonance point of the torsion bar. The filtering unit 400 removes the resonance point of the torsion bar by filtering a current steering angle (hereafter, referred to as 'first current steering angle') received from the steering angle sensor.

That is, the filtering unit 400 may remove column torque of a frequency component which is generated in case of a user's unintended steering intervention. The unintended steering intervention may indicate that the user touches a steering wheel without operating the steering wheel, or the influence of vibration caused by the road surface is mistaken as steering intervention. The frequency component which is generated in case of the user's unintended steering intervention may be a vibration frequency equal to the resonance point of the torsion bar of the MDPS within an error range.

The frequency band filtered by the filtering unit 400 may be decided according to the steering angular velocity of the steering angle sensor, and decided to include a resonance frequency which is caused according to the mechanism of the MDPS. That is, the frequency filtering band of the filtering unit 400 may be decided to include the resonance frequency which is decided according to steering angle acceleration.

As the filtering unit 400, at least one of a band stop filter, a notch filter and a lead-lag filter may be used.

The filtering unit 400 may remove steering wheel vibration which is not required for position control, thereby raising the stability of the control system. However, the responsiveness may not be improved. In order to solve such a problem, basic position control may be performed through the steering angle sensor, and responsiveness improvement control may be performed through a motor angle. The steering angle position control unit 200 which performs position control using the first current steering angle from the steering angle sensor and the responsiveness improvement unit 300 which improves the responsiveness using a current steering angle (hereafter, referred to as 'second current steering angle') from the motor will be described below in more detail.

The command steering angle control unit 100 removes noise of the command steering angle inputted from the autonomous driving system 20, and outputs the command steering angle. At this time, the command steering angle control unit 100 may be implemented by a variable LPF (Low Pass Filter) 110.

In general, autonomous driving is performed through recent steering angle position control. That is, when the autonomous driving system 20 applies a command steering angle to the MDPS 600, the MDPS 600 performs position control according to the command steering angle. At this time, when the steering angle position control unit 200 to perform position control receives the command steering angle command, an LPF is applied to remove noise. That is because, when noise is mixed with the received command steering angle, the steering angle position control unit 200 was supposed to follow the command steering angle, but may rather diverge. Furthermore, the received command steering angle may be instantaneously significantly changed according to a communication period or the resolution of the steering angle sensor. In case of sudden steering during autonomous driving, a large variation in the steering angle may be applied in the form of an impulse to the steering angle position control unit 200. Such high-frequency signals may rather degrade the performance of the steering angle position control unit 200, and pose a large threat to the stability. Thus, the cut-off frequency of the LPF is typically set according to a basic steering period.

Furthermore, the noise contained in the command steering angle applied to the steering angle position control unit 200 or the influence of the communication period may degrade the performance of the steering angle position control unit 200. In general, a command steering angle is not applied as an input of the steering angle position control unit 200, but is processed by an LPF. In this case, however, a cut-off frequency of the LPF is generally fixed. However, when an LPF having a fixed cut-off frequency is applied, the command steering angle may not be normally controlled in case of sudden steering. Thus, the cut-off frequency of the LPF for the command steering angle also needs to be varied through a differentiated value for a value that avoids the resonance point of the current steering angle. Otherwise, unintended steering wheel vibration may change the cut-off frequency of the variable LPF 110. In this case, control may not be normally performed. In the embodiment of the present disclosure, it is possible to implement the command steering angle control unit 100 which can adjust the cut-off frequency of the variable LPF 110 by differentiating the first current steering angle from which the resonance point has been removed through the filtering unit 400.

That is, the command steering angle control unit 100 may include the variable LPF 110 whose cut-off frequency can be adjusted through a process of removing noise of a command steering angle (hereafter, referred to as 'first command steering angle') inputted from the autonomous driving system 20, and outputting a second command steering angle.

The variable LPF 110 removes the noise of the first command steering angle by adjusting the cut-off frequency according to a steering situation. That is, the variable LPF 110 removes a noise component having a frequency equal to or higher than the cut-off frequency by low pass-filtering the first command steering angle. At this time, the cut-off frequency may be adjusted based on the first current steering angle filtered by the filtering unit 400.

Thus, the command steering angle control unit 100 may further include a differentiator 120 to adjust the cut-off frequency of the variable LPF 110.

The differentiator 120 may differentiate the first current steering angle filtered by the filtering unit 400, output the differentiated value as the current steering angular velocity, and adjust the cut-off frequency of the variable LPF 110 based on the output current steering angular velocity.

The command steering angle control unit 100 configured in the above-described manner may raise the stability of the steering angle position control unit 200 for the divergence of the steering angle position control unit 200 by low resolution or noise of the command steering angle and an impulse-based command which is generated in case of sudden steering, and maximize the responsiveness in a general situation, thereby improving the performance of the control device.

The steering angle position control unit 200 compensates for a first steering angle error (i.e. first position control error) corresponding to the difference between the second command steering angle provided from the command steering angle control unit 100 and the first current steering angle filtered by the filtering unit 400, and outputs a command current.

Such a steering angle position control unit 200 may include a position controller 210 and a velocity controller 220.

The position controller 210 may compensate for the first steering angle error corresponding to the difference between the second command steering angle and the filtered first current steering angle. At this time, the position controller 210 may be configured as a P controller.

The velocity controller 220 may compensate for a velocity error corresponding to the difference between the current steering angular velocity and the command velocity outputted by the position controller 210. At this time, the velocity controller 220 may be configured as a PI controller, and output a first command current.

However, the steering angle position control unit 200 including the position controller 210 and the velocity controller 220 may have a limitation in raising responsiveness. Thus, the steering angle position control unit 200 may further include a first calculator 230 configured to receive a required current from the responsiveness improvement unit 300, add the received required current to the first command current provided from the velocity controller 220, and output a second command current. The required current may be a value obtained by compensating for a second steering angle error, corresponding to the difference between the second command steering angle and the second current steering angle from the motor, through the responsiveness improvement unit 300.

The responsiveness improvement unit 300 may include a variable LPF 310, a differentiator 320 and a second calculator 330.

The variable LPF 310 low pass-filters the second steering angle error by adjusting the cut-off frequency. At this time, the variable LPF 310 may adjust the cut-off frequency based on the angular velocity of the motor or the steering angular velocity.

The differentiator 320 differentiates the value which is low pass-filtered by the variable LPF.

The second calculator 330 multiplies the value, differentiated by the differentiator 320, by a gain, and applies the multiplication result value as the compensation result value to the steering angle position control unit 200. At this time, the second calculator 330 may multiply the differentiated value by a gain based on the angular velocity of the motor or the steering angular velocity. Then, the steering angle position control unit 200 may apply the received compensation result value to the first command current, and output the second command current.

As described above, the responsiveness improvement unit 300 may low pass-filter an error value corresponding to the difference between the second command steering angle and the second current steering angle through the first calculator 230, differentiate the filtered value, multiply the differentiated value by the gain, and apply the multiplication result value to the steering angle position control unit 200. This operation may serve to add an additional required current, corresponding to the difference between the second command steering angle and the second current steering angle, to the command current, thereby raising the responsiveness of the steering angle position control unit 200.

Furthermore, the responsiveness improvement unit 300 may reduce the cut-off frequency of the variable LPF 310 and the value of the gain during low-speed steering, thereby maximizing the stability of the control system. When quick steering is needed, the responsiveness improvement unit 300 may raise the cut-off frequency of the variable LPF 310 and the value of the gain, thereby maximizing the responsiveness.

Furthermore, depending on whether the current steering angle is sensed through the steering angle sensor or sensed through the rotation of the motor, the performance of the controller may be significantly changed. The first reason is the resolution of the sensor. The steering angle sensor may transfer a steering angle to the MDPS 600 through communication. Thus, a time delay may occur, and the resolution of the steering angle sensor may be several or several tens of times lower than that of the encoder sensor of the motor. The second reason is that the steering angle sensor is typically mounted on the steering wheel in the case of an R-MDPS which is driven through a belt. In this case, as the torsion bar is distorted, the steering angle of the steering angle sensor may become different from an actual rotation angle of a tire. That is, when only the steering wheel vibrates while the tire angle is fixed, such a vibration signal may be applied to the steering angle position control unit 200 as it is. In this case, the performance of the controller may be significantly degraded. Thus, the second current steering angle converted through the motor is normally used by the steering angle position control unit 200. However, when a belt slip occurs, a difference may occur between the actual steering angle of the vehicle in operation and the steering angle controlled by the MDPS 600. In this case, the vehicle may move in an unintended direction. Therefore, in order to make up for the difference, the steering angle of the steering angle sensor may be used as a feedback signal of the steering angle position control unit 200, and the responsiveness improvement unit 300 for improving responsiveness may use the steering angle converted through the motor, thereby simultaneously improving the responsiveness and the stability.

The responsiveness improvement unit 300 may be similar to a D controller of a PID controller. However, when the D controller is applied as the responsiveness improvement unit 300, applied noise may be significantly amplified to significantly degrade the performance of the controller. This is because the D controller has the same configuration as the differentiator 320. When noise is applied, the noise may be significantly amplified in case that the noise is differentiated. In order to prevent the amplification of the noise, the responsiveness improvement unit 300 may include an LPF or lag filter applied to the previous stage of the differentiator 320. In this case, unintended noise or the like may be filtered, and only a control change in a required band may be filtered. Simultaneously, the filtered signal may be applied to the current controller 500 in real time, which makes it possible to raise the control responsiveness and to guarantee the stability.

As described above, the steering angle position control unit 200 may use the first current steering angle of the steering angle sensor, thereby maintaining a sense of unity with an actual motion of the vehicle. Also, the steering angle position control unit 200 may use the second current steering angle converted through the motor as the part for raising only the responsiveness of the controller, thereby removing the basic instability of the steering angle position control unit 200, which is caused by a belt slip.

The current controller 500 compensates for a current error corresponding to the difference between a sensor current and the command current outputted from the steering angle position control unit 200, and outputs a final command current. At this time, the current controller 500 may be a PI controller, and the sensor current may be a current acquired by an MCU (not illustrated) to sense the motor.

When receiving the second command current from the steering angle position control unit 200 and receiving the sensor current from the MCU, the current controller 500 may compensate for the current error corresponding to the difference between the second command current and the sensor current, output the final command current, and apply the final command current to the MDPS 600.

Hereafter, a method for controlling an MDPS in accordance with an embodiment of the present disclosure will be described with reference to FIG. 2.

Figure 2:
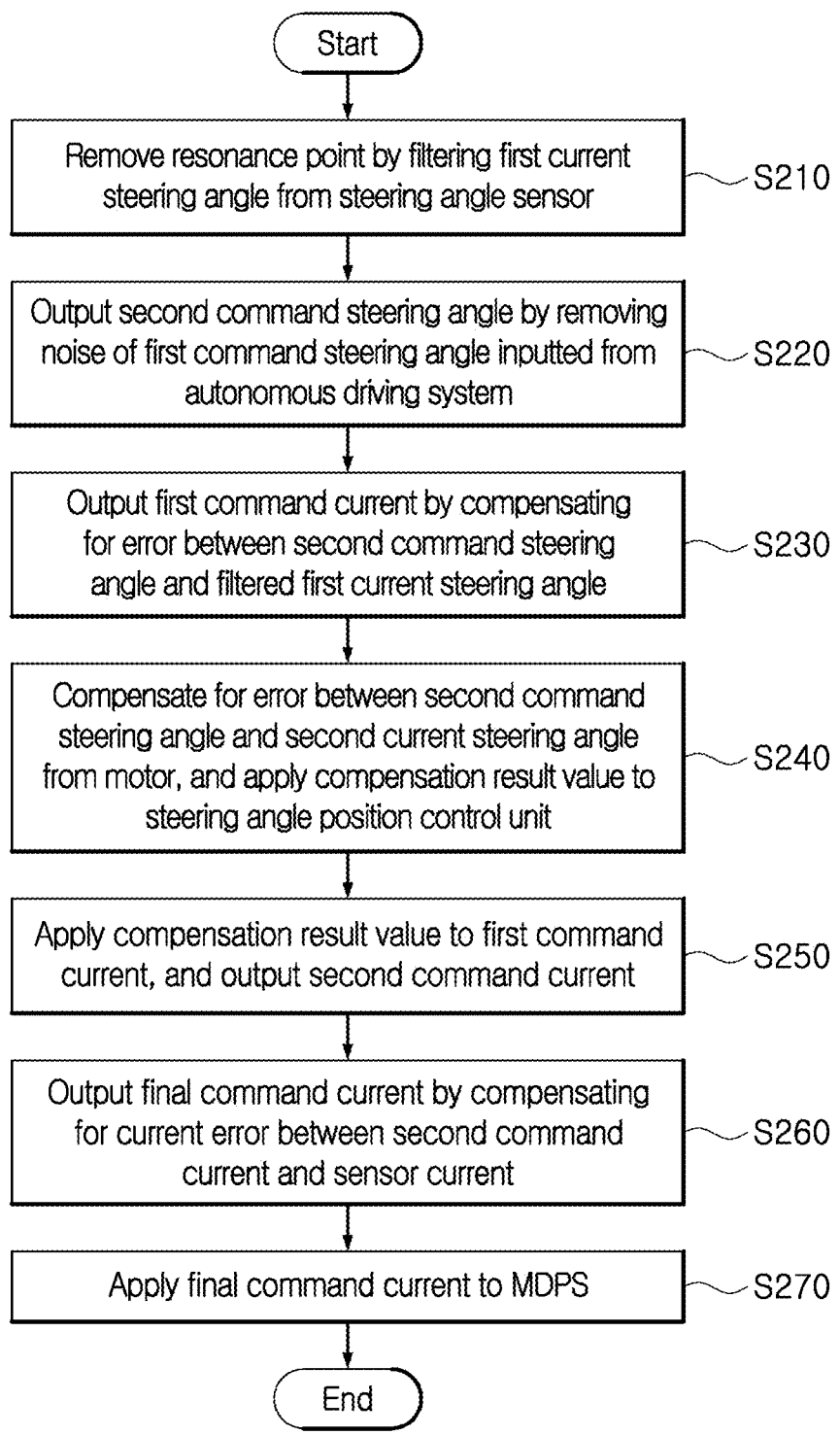
FIG. 2 is a flowchart for describing a method for controlling an MDPS in accordance with an embodiment of the present disclosure.

FIG. 2 is a flowchart for describing a method for controlling an MDPS in accordance with an embodiment of the present disclosure.

Referring to FIG. 2, the filtering unit 400 removes a resonance point by filtering the first current steering angle provided from the steering angle sensor, in step S210. That is, the filtering unit 400 may remove column torque of a frequency component which is generated in case of a user's unintended steering intervention. The unintended steering intervention may indicate that the user touches a steering wheel without operating the steering wheel, or the influence of vibration caused by the road surface is mistaken as steering intervention. The frequency component which is generated in case of the user's unintended steering intervention may be a vibration frequency equal to the resonance point of the torsion bar of the MDPS within an error range.

When step S210 is performed, the command steering angle control unit 100 removes noise of the first command steering angle inputted from the autonomous driving system 20, and outputs the second command steering angle, in step S220. At this time, the command steering angle control unit 100 may differentiate the first current steering angle filtered by the filtering unit 400 and output the differentiated value as the current steering angular velocity. Based on the current steering angular velocity, the command steering angle control unit 100 may remove the noise of the first command steering angle by adjusting the cut-off frequency of the variable LPF 110, and output the second command steering angle from which noise has been removed.

When step S220 is performed, the steering angle position control unit 200 compensates for the first steering angle error corresponding to the difference between the second command steering angle inputted from the command steering angle control unit 100 and the first current steering angle inputted from the filtering unit 400, and outputs the first command current, in step S230. At this time, the position controller 210 may output a command speed by compensating for the first steering angle error, and the velocity controller 220 may output the first command current by compensating for the velocity error corresponding to the difference between the current steering angular velocity and the command speed outputted from the position controller 210.

When step S230 is performed, the responsiveness improvement unit 300 compensates for the second steering angle error corresponding to the difference between the second command steering angle and the second current steering angle provided from the motor, and applies the compensation result value to the steering angle position control unit 200, in step S240. At this time, the variable LPF 310 may low pass-filter the second steering angle error by adjusting the cut-off frequency, in order to remove a noise component. Then, the differentiator 320 may differentiate the low pass-filtered value, and the second calculator 330 may multiply the differentiated value by a gain, and apply the multiplication result value to the steering angle position control unit 200.

When step S240 is performed, the steering angle position control unit 200 applies the compensation result value, received from the responsiveness improvement unit 300, to the first command current, and outputs the second command current, in step S250. That is, the steering angle position control unit 200 may add the compensation result value to the first command current, and output the second command current.

When step S250 is performed, the current controller 500 compensates for the current error corresponding to the difference between the sensor current and the second command current outputted from the steering angle position control unit 200, and outputs the final command current, in step S260. Then, the current controller 500 applies the final command current to the MDPS 600 in step S270. At this time, when receiving the second command current from the steering angle position control unit 200 and receiving the sensor current from the MCU, the current controller 500 may compensate for the current error corresponding to the difference between the second command current and the sensor current, and output and apply the final command current to the MDPS 600.

As such, the apparatus and method for controlling an MDPS in accordance with an aspect of the present disclosure may raise the responsiveness of the R-MDPS during autonomous driving, and stably maximize the performance thereof, thereby enabling a vehicle to avoid an accident.

Furthermore, the apparatus and method for controlling an MDPS in accordance with another aspect of the present disclosure can improve the responsiveness even while the steering angle position control unit 200 basically uses the steering angle of the steering angle sensor for a driver's safety. Even when a belt slip occurs, the apparatus and method can maintain autonomous driving without any problems.

Furthermore, the apparatus and method for controlling an MDPS in accordance with still another aspect of the present disclosure may be robust to noise of the command steering angle, and thus raise the stability of the controller and the responsiveness.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling an MDPS (Motor Driven Power Steering), comprising:
    a filtering unit configured to filter a specific frequency from a first current steering angle provided from a steering angle sensor;
    a command steering angle control unit configured to remove noise of a first command steering angle inputted from an autonomous driving system, and output a second command steering angle;
    a steering angle position control unit configured to compensate for a first steering angle error corresponding to a difference between the second command steering angle and the first current steering angle filtered by the filtering unit, and output a first command current;
    a responsiveness improvement unit configured to compensate for a second steering angle error corresponding to the difference between the second command steering angle and a second current steering angle provided from a motor, and apply a compensation result value to the steering angle position control unit; and
    a current controller configured to compensate for a current error corresponding to the difference between a sensor current and a command current outputted from the steering angle position control unit and output a final command current to the MDPS of a vehicle, wherein the MDPS provides steering assist power to a steering wheel of the vehicle based on the final command current.

2. The apparatus of claim 1, wherein the filtering unit removes column torque of a frequency component which is generated in case of a user's unintended steering intervention, wherein the frequency component generated in case of the user's unintended steering intervention is a vibration frequency equal to a resonance point of a torsion bar of the MDPS within an error range.

3. The apparatus of claim 2, wherein the filtering unit comprises one or more of a band stop filter, a notch filter and a lead-lag filter.

4. The apparatus of claim 1, wherein the command steering angle control unit comprises a variable LPF (Low Pass Filter) configured to remove noise of the first command steering angle by adjusting a cut-off frequency according to a steering condition.

5. The apparatus of claim 4, wherein the command steering angle control unit further comprises a differentiator configured to output a current steering angular velocity by differentiating the filtered first current steering angle, and adjust the cut-off frequency of the variable LPF based on the current steering angular velocity.

6. The apparatus of claim 1, wherein the steering angle position control unit outputs a second command current by applying the compensation result value, received from the responsiveness improvement unit, to the first command current, and comprises:
a position controller configured to compensate for the first steering angle error;
a velocity controller configured to output the first command current by compensating for a velocity error corresponding to the difference between a current steering angular velocity and a command speed outputted from the position controller; and
a first calculator configured to output the second command current by adding the compensation result value to the first command current.

7. The apparatus of claim 1, wherein the responsiveness improvement unit comprises:
a variable LPF configured to low pass-filter the second steering angle error by adjusting a cut-off frequency;
a differentiator configured to differentiate a low pass-filtered value from the variable LPF; and
a second calculator configured to multiply the differentiated low pass-filtered value by a gain, and apply a multiplication result value as the compensation result value to the steering angle position control unit.

8. The apparatus of claim 7, wherein the variable LPF adjusts the cut-off frequency based on an angular velocity of the motor or a steering angular velocity.

9. The apparatus of claim 7, wherein the second calculator multiplies the differentiated value by a gain based on an angular velocity of the motor or a steering angular velocity.

10. A method for controlling an MDPS, comprising:
filtering, by a filtering unit, a specific frequency from a first current steering angle provided from a steering angle sensor;
removing, by a command steering angle control unit, noise of a first command steering angle inputted from an autonomous driving system, and outputting a second command steering angle;
compensating for, by a steering angle position control unit, a first steering angle error corresponding to a difference between the second command steering angle and the first current steering angle filtered by the filtering unit, and outputting a first command current;
compensating for, by a responsiveness improvement unit, a second steering angle error corresponding to the difference between the second command steering angle and a second current steering angle provided from a motor, and applying a compensation result value to the steering angle position control unit;
outputting, by the steering angle position control unit, a second command current by applying the compensation result value to the first command current;
outputting, by a current controller, a final command current by compensating for a current error corresponding to the difference between the second command current and a sensor current, and applying the final command current to the MDPS, after the outputting of the second command current, and
providing, by the MDPS, steering assist power to a steering wheel of the vehicle based on the final command current.

11. The method of claim 10, wherein in the filtering of the specific frequency, the filtering unit removes column torque of a frequency component which is generated in case of a user's unintended steering intervention,
wherein the frequency component generated in case of the user's unintended steering intervention is a vibration frequency which is equal to a resonance point of a torsion bar of the MDPS within an error range.

12. The method of claim 11, wherein the outputting of the second command steering angle comprises:
outputting, by a differentiator, a current steering angular velocity by differentiating the filtered first current steering angle; and
adjusting, by a variable LPF, a cut-off frequency based on the output current steering angular velocity.

13. The method of claim 10, wherein the outputting of the second command steering angle comprises removing, by a variable LPF, noise of the first command steering angle by adjusting a cut-off frequency according to a steering condition, and outputting a second command steering angle from which the noise is removed.

14. The method of claim 10, wherein the outputting of the first command current comprises:
outputting, by a position controller, a command velocity by compensating for the first steering angle error; and
outputting, by a velocity controller, the first command current by compensating for a velocity error corresponding to the difference between a current steering angular velocity and the command velocity outputted from the position controller.

15. The method of claim 10, wherein the applying of the compensation result value to the steering angle position control unit comprises:
low pass-filtering, by a variable LPF, the second steering angle error by adjusting a cut-off frequency;
differentiating, by a differentiator, a low pass-filtered value from the variable LPF; and
multiplying, by a second calculator, the differentiated low pass-filtered value by a gain, and applying a multiplication result value as the compensation result value to the steering angle position control unit.

16. The method of claim 15, wherein in the low pass-filtering of the second steering angle error, the variable LPF adjusts the cut-off frequency based on an angular velocity of the motor or a steering angular velocity.

17. The method of claim 15, wherein in the applying of the compensation result value to the steering angle position control unit, the second calculator multiplies the differentiated value by a gain based on an angular velocity of the motor or a steering angular velocity.

* * * * *